United States Patent
Vano Newman et al.

(10) Patent No.: US 10,826,981 B2
(45) Date of Patent: *Nov. 3, 2020

(54) PROCESSING REQUESTS WITH UPDATED ROUTING INFORMATION

(71) Applicant: MICROSOFT TECHNOLOGY LICENSING, LLC, Redmond, WA (US)

(72) Inventors: Joaquin Vano Newman, Carnation, WA (US); Yaohua Yang, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 539 days.

This patent is subject to a terminal disclaimer.

(21) Appl. No.: 14/875,480

(22) Filed: Oct. 5, 2015

(65) Prior Publication Data

US 2016/0028801 A1    Jan. 28, 2016

Related U.S. Application Data

(63) Continuation of application No. 13/711,213, filed on Dec. 11, 2012, now Pat. No. 9,154,540.

(51) Int. Cl.
*H04L 29/08* (2006.01)
*H04L 12/705* (2013.01)
*H04L 12/911* (2013.01)

(52) U.S. Cl.
CPC .......... *H04L 67/1014* (2013.01); *H04L 45/18* (2013.01); *H04L 47/745* (2013.01); *H04L 67/02* (2013.01); *H04L 67/1029* (2013.01); *H04L 67/2804* (2013.01)

(58) Field of Classification Search
CPC ........... H04L 29/08198; H04L 67/1014; H04L 47/745; H04L 45/18; H04L 67/2804; H04L 67/02
See application file for complete search history.

(56) References Cited

U.S. PATENT DOCUMENTS 6,249,801 B1 *  6/2001  Zisapel .................. G06F 9/505
                                                    718/105
6,665,702 B1 * 12/2003  Zisapel .................. G06F 9/505
                                                    709/223

(Continued)

OTHER PUBLICATIONS

"Lonocloud", Retrieved From <<http://lonocloud.com/service_providers.html>> Retrieved Date: Oct. 12, 2012, 4 Pages.

(Continued)

*Primary Examiner* — Lance Leonard Barry
(74) *Attorney, Agent, or Firm* — Workman Nydegger (57) ABSTRACT

Requests for resources of a web based service are processed by at least updating routing information by a load balancer after determining that a requested resource is not available in a first version of a web based service. The updated routing information indicates the request was previously made against the first version of the web based service and is readable by a second version of the web based service to allow the second version of the web based service to handle the request as a request from the first version and not simply a brand new request.

20 Claims, 7 Drawing Sheets

(56) References Cited

U.S. PATENT DOCUMENTS

| | | | |
|---|---|---|---|
| 6,718,359 B2* | 4/2004 | Zisapel | G06F 9/505 709/238 |
| 6,810,021 B1* | 10/2004 | Sakurai | H04L 45/18 370/242 |
| 7,360,208 B2 | 4/2008 | Joshi et al. | |
| 7,555,751 B1 | 6/2009 | Abbavaram et al. | |
| 7,984,148 B2* | 7/2011 | Zisapel | G06F 9/505 709/224 |
| 8,139,584 B2* | 3/2012 | Suzuyama | H04L 12/462 370/392 |
| 8,181,071 B2* | 5/2012 | Cahill | H04L 12/403 709/225 |
| 8,316,099 B2* | 11/2012 | Diggs | G06F 16/10 709/217 |
| 8,700,773 B2* | 4/2014 | Caplan | G06F 9/505 709/217 |
| 8,782,208 B2* | 7/2014 | Belinchon Vergara | H04L 29/06027 709/224 |
| 9,154,540 B2* | 10/2015 | Vano Newman | H04L 67/02 709/203 |
| 9,800,690 B1* | 10/2017 | Clarke | H04L 67/2814 |
| 2002/0010783 A1* | 1/2002 | Primak | G06F 9/505 709/228 |
| 2003/0005111 A1* | 1/2003 | Allan | H04L 41/5009 709/224 |
| 2003/0195984 A1* | 10/2003 | Zisapel | G06F 9/505 709/238 |
| 2005/0010685 A1* | 1/2005 | Ramnath | H04L 67/1097 709/238 |
| 2005/0220095 A1* | 10/2005 | Narayanan | H04L 63/126 370/389 |
| 2008/0107025 A1* | 5/2008 | Cho | H04L 41/0677 370/235 |
| 2008/0194198 A1* | 8/2008 | Namihira | H04L 47/10 455/7 |
| 2009/0006884 A1* | 1/2009 | Cahill | H04L 12/403 714/4.1 |
| 2009/0037367 A1* | 2/2009 | Wein | G06F 9/5061 |
| 2009/0238080 A1* | 9/2009 | Hirano | H04L 12/4633 370/241 |
| 2009/0245113 A1* | 10/2009 | Kamiya | H04L 65/80 370/238 |
| 2010/0162226 A1 | 6/2010 | Borissov et al. | |
| 2010/0189118 A1* | 7/2010 | Nonaka | H04L 12/4641 370/401 |
| 2010/0228819 A1* | 9/2010 | Wei | G06F 9/505 709/203 |
| 2011/0138052 A1* | 6/2011 | Caplan | G06F 9/505 709/226 |
| 2013/0124712 A1* | 5/2013 | Parker | H04L 41/5038 709/224 |
| 2013/0287024 A1* | 10/2013 | Herberg | H04L 47/323 370/392 |
| 2014/0164479 A1* | 6/2014 | Vano Newman | H04L 67/02 709/203 |

OTHER PUBLICATIONS

"Using Shadowbase to Eliminate Planned Downtime via Zero Downtime Migrations", Retrieved From <<http://www.gravic.com/shadowbase/pdf/white-papers/Eliminating-Planned-Downtime-with-Shadowbase-White-Paper.pdf>> Retrieved Date: Oct. 12, 2012, 26 Pages.

"Final Office Action Issued in U.S. Appl. No. 13/711,213", dated Jan. 5, 2015, 10 Pages.

"Non-Final Office Action Issued in U.S. Appl. No. 13/711,213", dated Oct. 3, 2014, 10 Pages.

"Notice of Allowance Issued in U.S. Appl. No. 13/711,213", dated Jun. 3, 2015, 7 Pages.

Guthrie, Scott, "Introducing the Microsoft Web Farm Framework", Retrieved from <<http://weblogs.asp.net/scottgu/introducing-the-microsoft-web-farm-framework>> Sep. 8, 2010, 25 Pages.

Neale, Michael, "Zero Downtime App Updates", Retrieved from<<http://developer.cloudbees.com/bin/view/RUN/Zero+downtime+app+updates>> Retrieved Date: Oct. 12, 2012, 3 Pages.

* cited by examiner

PROCESSING REQUESTS WITH UPDATED ROUTING INFORMATION

CROSS-REFERENCE TO RELATED APPLICATIONS

This application is a continuation of U.S. patent application Ser. No. 13/711,213 filed on Dec. 11, 2012, entitled "SMART REDIRECTION AND LOOP DETECTION MECHANISM FOR LIVE UPGRADE LARGE-SCALE WEB CLUSTERS," which issued as U.S. Pat. No. 9,154,540 on Oct. 6, 2015, and which application is expressly incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, Universal Serial Bus (USB), or other connections. The connections allow a computing system to access services at other computing systems and to quickly and efficiently receive application data from other computing system.

In this description and the following claims, "cloud computing" is defined as a model for enabling ubiquitous, convenient, on-demand network access to a shared pool of configurable computing resources (e.g., networks, servers, storage, applications, and services) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud-scale web clusters include anywhere from a few dozen to upwards of hundreds or thousands of individual machines (virtual or bare-metal). A web cluster also contains highly volatile as well as semi-stable state information. The combination of cloud-scale and variable state information creates an enormous challenge for administrators attempting to perform live upgrades on such clusters while still serving active traffic. In particular, there may be a need to have both old versions of cluster and new versions of clusters running simultaneously.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for handling requests for resources of a web based service. The method includes receiving a request from an external client for a resource. The method further includes determining that the resource is not available in a first version of a web based service. The method further includes providing routing information to a second version of the web based service. The routing information is readable by the second version of the web based service to allow the second version of the web based service to handle the request as a request from the first version and not simply a brand new request from the external client.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments may implement a framework for live upgrade scenarios by enabling resolving web sites across web clusters based on smart redirection of requested sites. Embodiments may use a loop detection and redirection mechanism that can arbitrate website ownership while a cluster is in the midst of an upgrade.

Embodiments may facilitate in-place live upgrades and/or in-place live migrations. Embodiments may enable automated in-place upgrades of product binaries, state information and underlying hardware while performing live cluster upgrades. Functionality provided by the web cluster during both in-place live upgrades and in-place live migrations can be performed with zero customer-perceived downtime.

Embodiments may exhibit certain functionality. For example, embodiments may include centralized routing for all load balancing across web clusters even when different parts of the clusters are running different versions of software and hardware. Alternatively or additionally, embodiments may include a mechanism to automatically redirect web site Hypertext Transfer Protocol (HTTP) requests across web clusters so that a web site temporarily affinitizes to a stable combination of software/hardware versions while underlying clusters are in the process of being upgraded. Alternatively, or additionally, embodiments may include the ability to detect and terminate redirection loops for HTTP requests to web sites not currently provisioned in any cluster. This enables websites to be actively provisioned and de-provisioned even though live clusters are in the process of being upgraded. Alternatively or additionally, embodiments may include the ability to enable SxS deployment and operation of different versions of software and hardware on live clusters.

Referring now to FIGS. 1 through 6, various embodiments are illustrated. In the example embodiments, vCurrent is a current version of a web hosting system that is to be upgraded. vNext is the next version of a web hosting system to upgrade. Front End (FE) is a software load balancer (SLB) and part of a web hosting system. In some embodiments, the SLB is based on ARR (Application Request Routing for Internet Information Services (IIS) available from Microsoft® Corporation of Redmond Washington) but embodiments may extend the SLB capability by querying a routing table from a database. The routing table can contain more than one server that is able to handle the request based on customer's site configuration and ARR will balance the load based on ARR capabilities (round robin, etc.). If no server has been assigned to serve a customer's site request, the FE will initiate the allocation before routing the message. Also at this point the FE is able to route the message to vNext if the site is not in the database and the web hosting system is in upgrade mode and embodiments have not detected a routing loop as described in more detail below. When vCurrent and vNext are working SxS and Hosters are upgrading web sites from vCurrent to vNext, the FEs will handle incoming request and will forward them appropriately.

Figure 1:
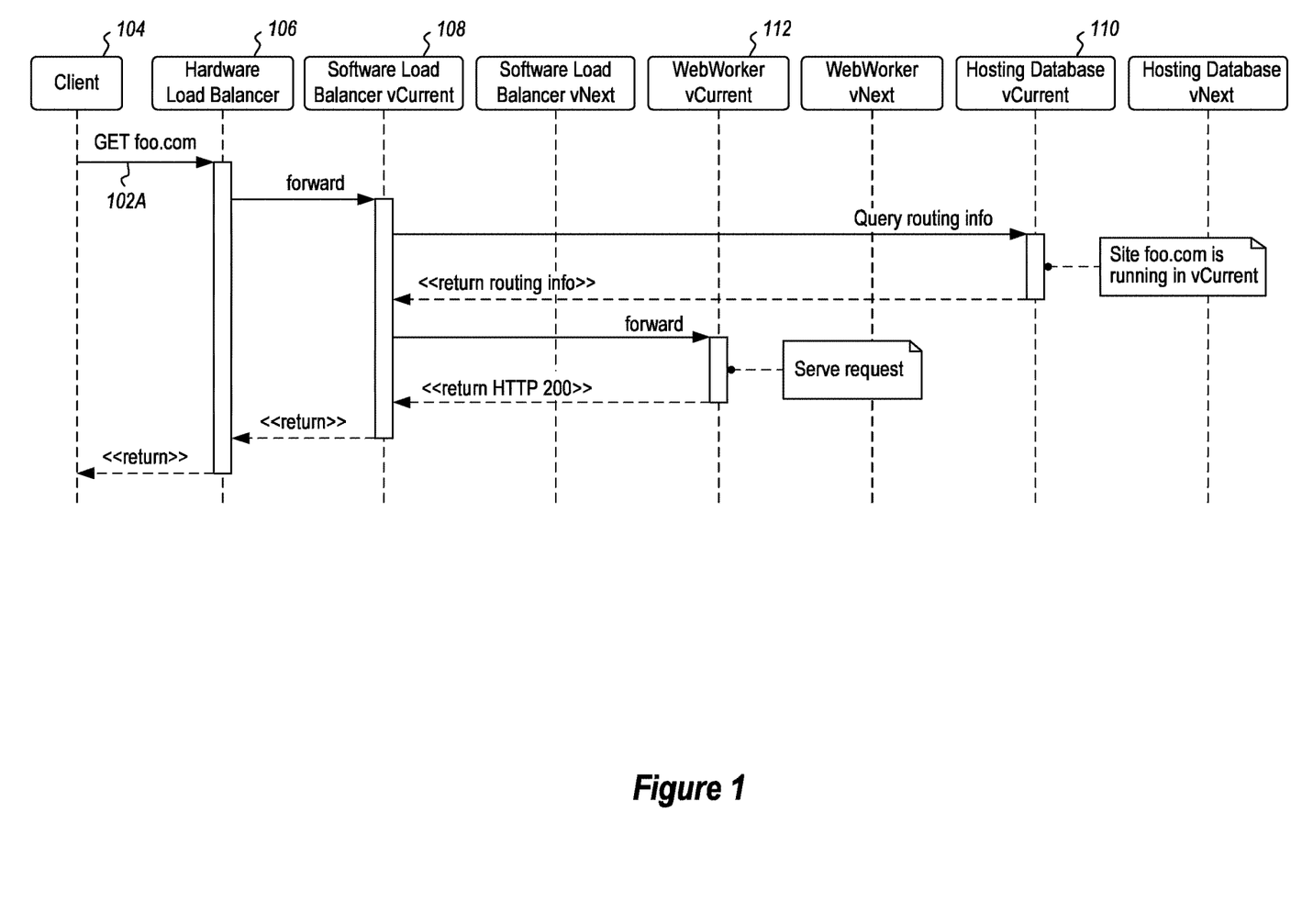
FIG. 1 illustrates a system and message flow where a request for a valid site running in a current version of a web based service is forwarded from a hardware load balancer to the current version of the web based service.

There are six scenarios that the FEs are prepared to handle as illustrated in the following description of the six figures, FIGS. 1-6. In a first scenario as illustrated in FIG. 1, a request 102A from a client 104 is made for a valid site (in this example, the fictional site foo.com), running in vCurrent. The request is forwarded from a hardware load balancer 106 to vCurrent. The vCurrent FE 108 queries routing information in vCurrent hosting database 110 and determines that the site foo.com is a valid site running the vCurrent web cluster. The vCurrent hosting database 110 returns the routing information of the vCurrent Web Worker 112 that will serve the request 102A. The vCurrent software load balancer forwards the request 102A to the assigned vCurrent Web Worker 112. The vCurrent Web Worker 112 serves the request 102A.

Figure 2:
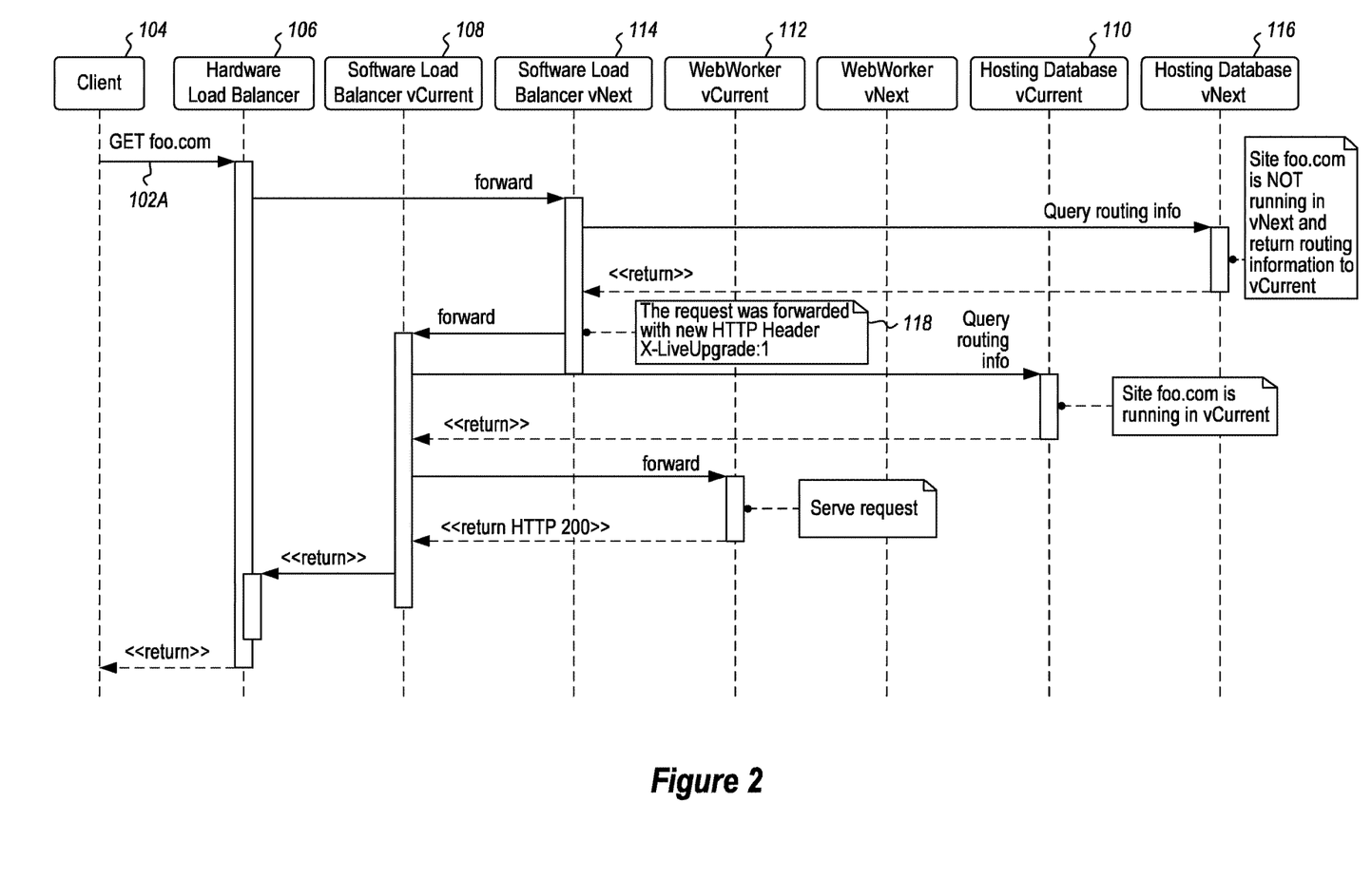
FIG. 2 illustrates a system and message flow where a request for a valid site running in a current version of a web based service is forwarded from a hardware load balancer to a subsequent version of the web based service.

In a second scenario, as illustrated in FIG. 2, a request 102A from a client 104 for a valid site, foo.com, running in vCurrent is made. The request 102A is forwarded from the hardware load balancer to vNext. The vNext FE 114 queries the routing information in vNext hosting database 116 and determines that the site is not valid for vNext. The vNext hosting database 116 returns the routing information of the vCurrent FE 108 that can handle the request 102A. The vNext FE 114 forwards the request to the vCurrent FE 108 adding an HTTP Header 118 named X-LiveUpgrade with a value of 1. The vCurrent FE 108 queries the routing information in the vCurrent hosting database 110 and determines that the site foo.com is valid. The vCurrent FE 108 returns the routing information of the vCurrent web worker 112 that will serve the request. The request 102A is forwarded to the assigned vCurrent web worker 112. The vCurrent web worker serves the request 102A.

Figure 3:
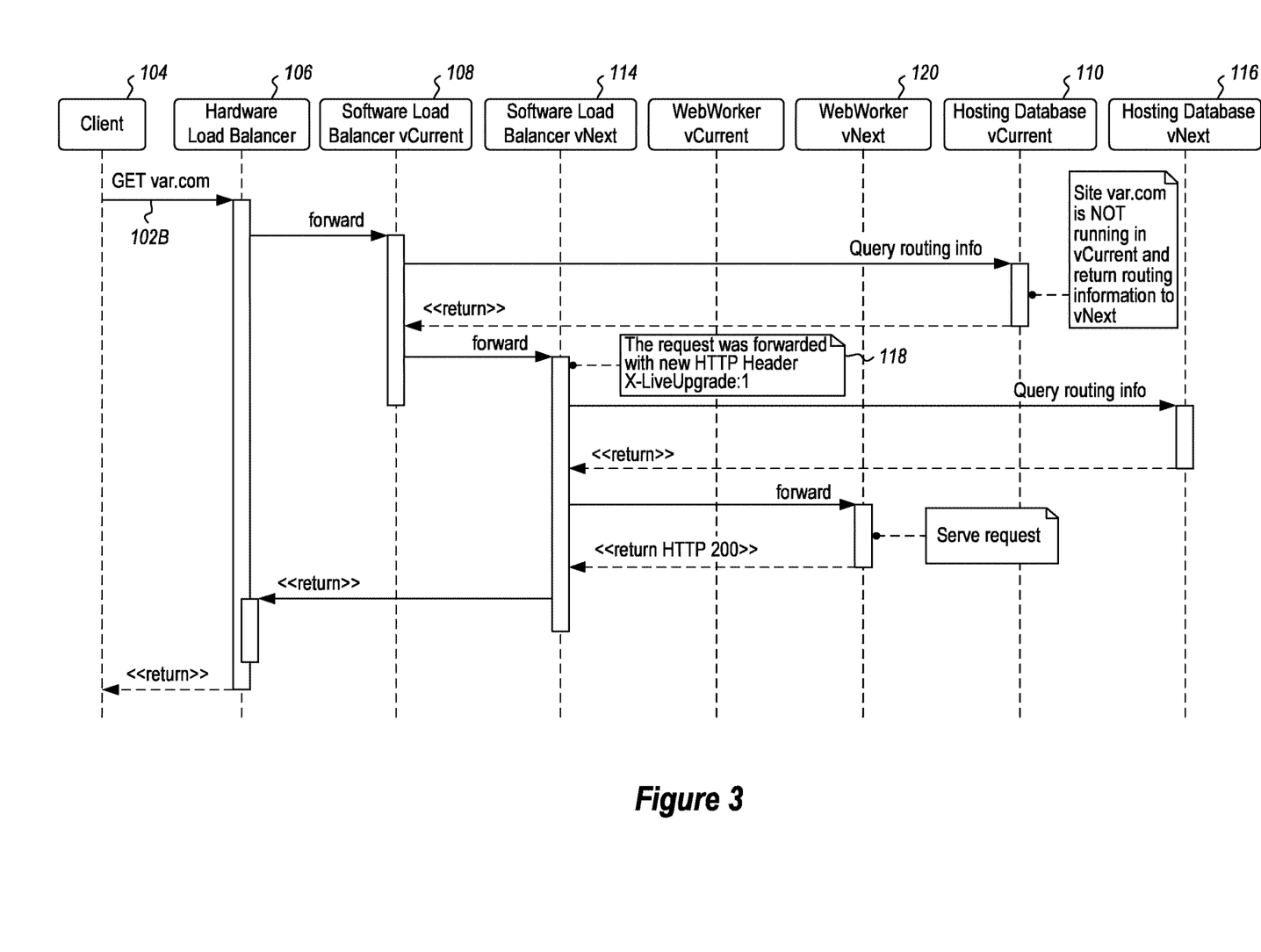
FIG. 3 illustrates a system and message flow where a request for a valid site running in a subsequent version of a web based service is forwarded from a hardware load balancer to a current version of the web based service.

In a third example illustrated in FIG. 3, a request 102B is made by a client 104 for a valid site, (in this example, the fictional site var.com), running in vNext. The request 102B is forwarded from the hardware load balancer 106 to the vCurrent FE 108. The vCurrent FE 108 queries the routing information in the vCurrent hosting database 110 and determines that the site var.com is not valid for vCurrent. However, the vCurrent hosting database 110 returns the routing information of the vNext Fes (including vNext FE 114, that can handle the request 102B to the vCurrent FE 108. The vCurrent FE 108 forwards the request to a vNext FE 114 adding an HTTP Header 118 named X-LiveUpgrade with a value of 1. The vNext FE 114 queries the routing information in the vNext hosting database 116 and determines that the site var.com is valid for vNext. The vNext hosting database 116 returns the routing information of the vNext Web Worker 120 that will serve the request 102B. The vNext FE 114 forwards the request 102B to the assigned vNext web worker 120. The vCurrent web worker 120 serves the request.

Figure 4:
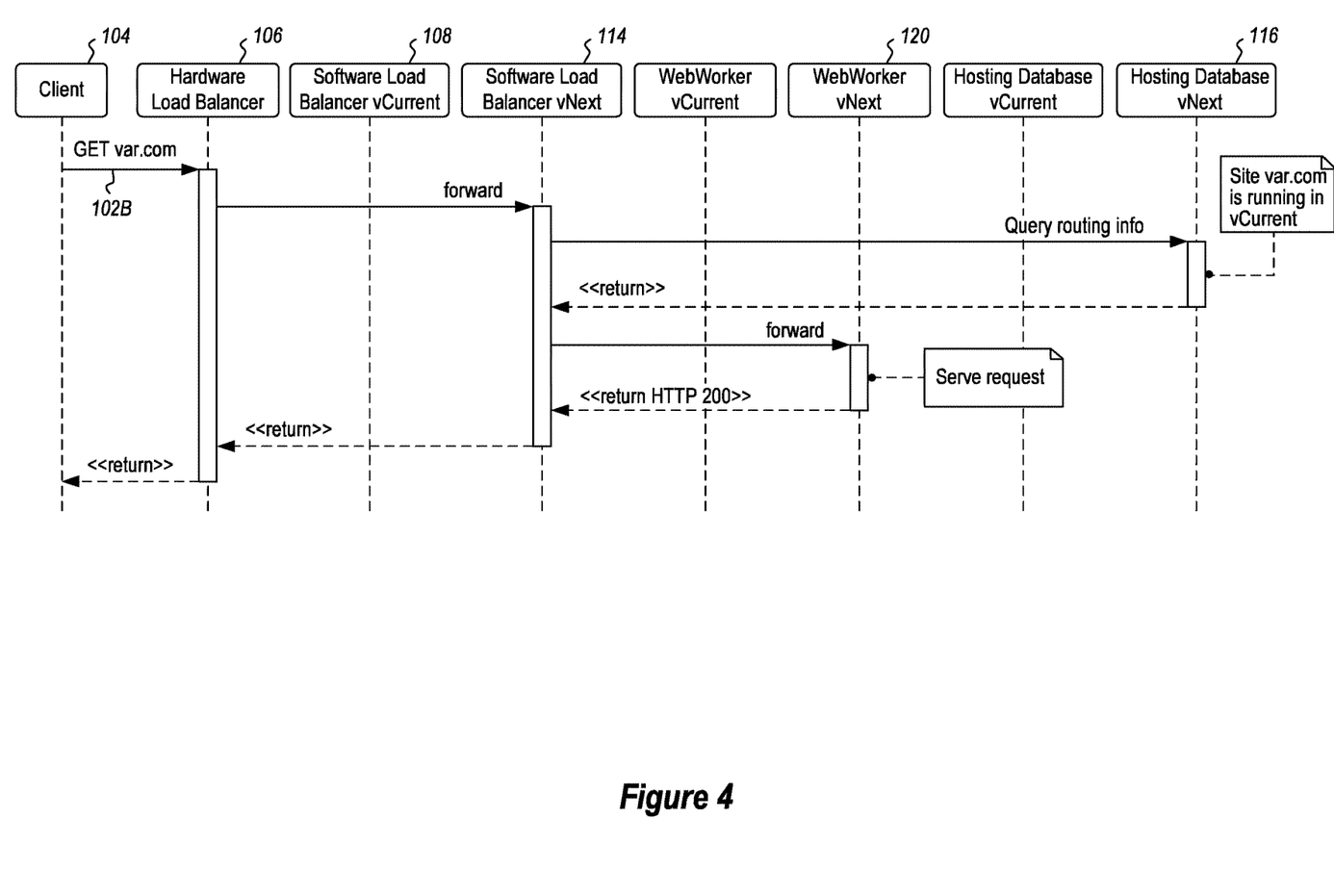
FIG. 4 illustrates a system and message flow where a request for a valid site running in a subsequent version of a web based service is forwarded from a hardware load balancer to the subsequent version of the web based service.
Figure 5:
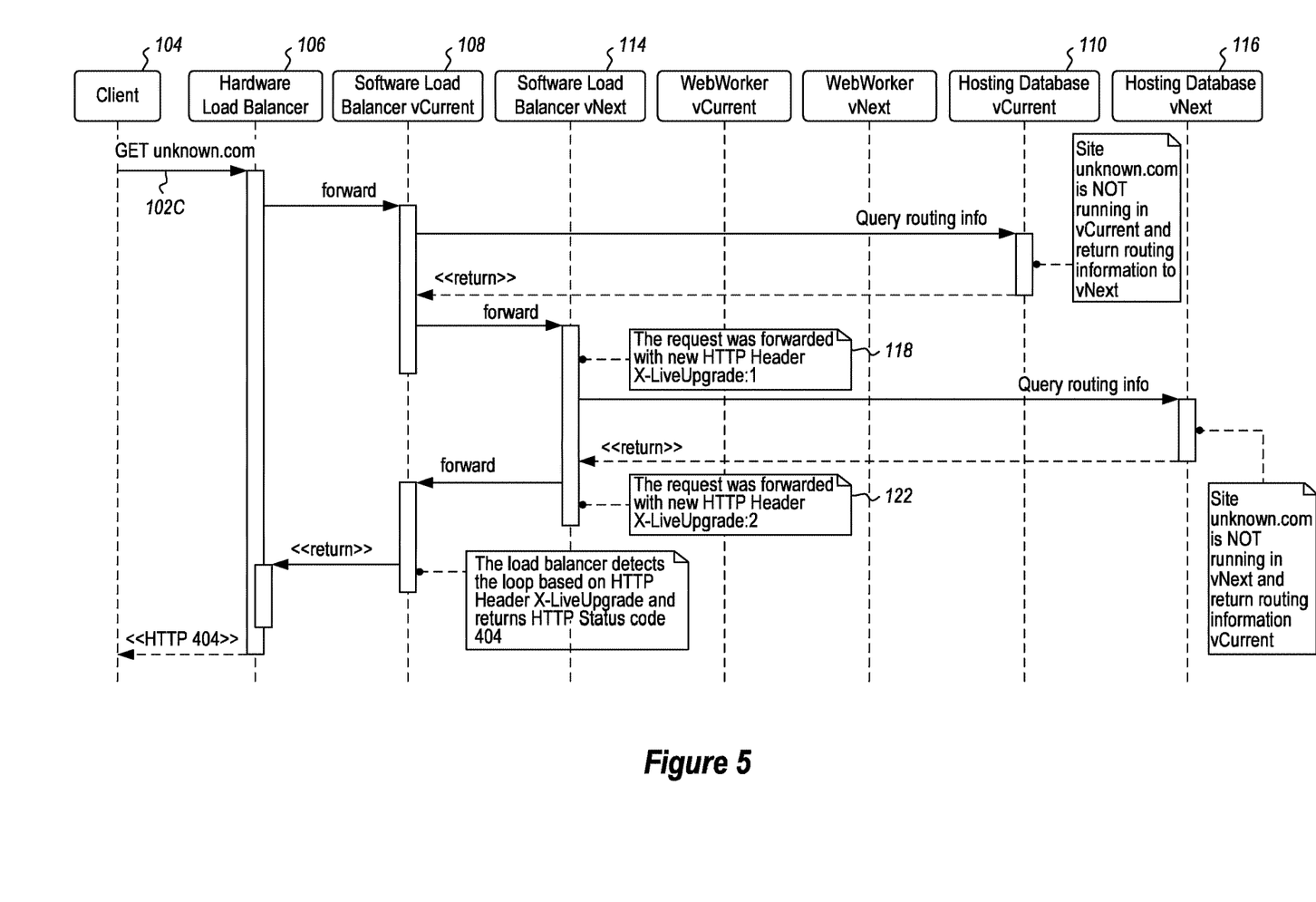
FIG. 5 illustrates a system and message flow where a request for an invalid site is forwarded from a hardware load balancer to a current version of the web based service.

A fourth scenario is illustrated in FIG. 4. A request 102B is made by a client 104 for a valid site, var.com, running in vNext. The request 102B is forwarded from the hardware load balancer 106 to the vNext FE 114. The vNext FE 114 queries the routing information in the vNext hosting database 116 and determines that the site var.com is valid for vNext. The vNext hosting database 116 returns, to the vNext FE 114, the routing information of the vNext web worker 120 that will serve the request 102B. The vNext FE 114 forwards the request 102B to the assigned vNext web worker 120. The vNext web worker 120 serves the request A fifth scenario is illustrated in FIG. 5. A request 102C for an invalid site is made by a client 104. The request 102C is forwarded from the hardware load balancer 106 to vCurrent FE 108. The vCurrent FE 108 queries the routing information in vCurrent hosting database 110 and determines that the site is not valid. The vCurrent hosting database 110 returns the routing information of the vNext FEs, including vNext FE 114, that can handle the request 102C. The vCurrent FE 108 forwards the request 102C to the vNext FE 114 adding an HTTP Header118 named X-LiveUpgrade with value 1. The vNext FE 114 queries the routing information in the vNext hosting database 116 and determines that the site is not valid. The vNext FE 114 forwards the request 102C to the vCurrent FE 108 adding an HTTP Header 122 named X-LiveUpgrade with value 2. The vCurrent FE 108 detects the loop based on the HTTP Header 122

X-LiveUpgrade and returns an HTTP 404 indicating that the site is not valid for either of vCurrent or vNext.

Figure 6:
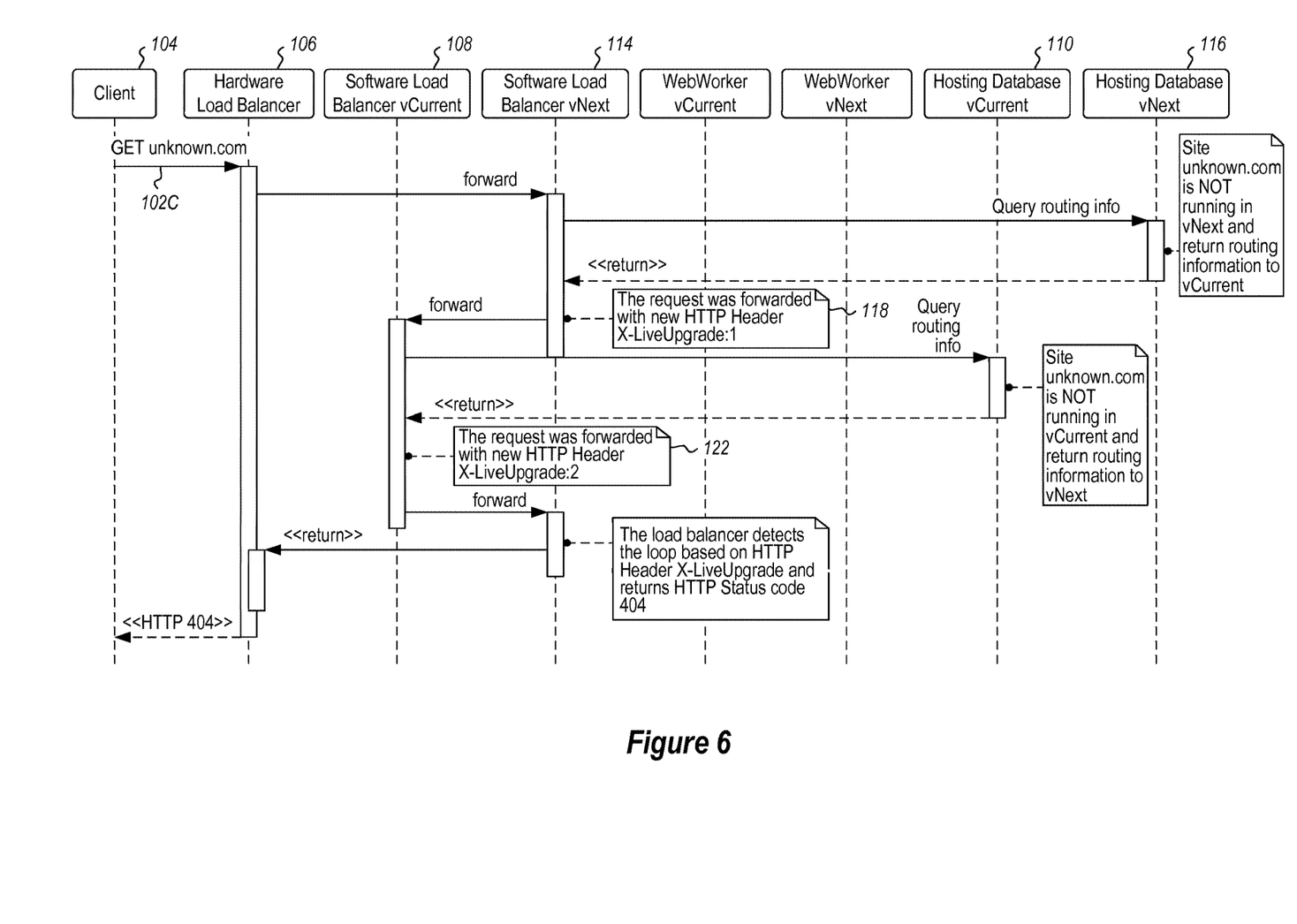
FIG. 6 illustrates a system and message flow where a request for an invalid site is forwarded from a hardware load balancer to a current version of the web based service.

In a sixth scenario as illustrated in FIG. 6, a request 102C for an invalid site is sent from a client 104. The request 102C is forwarded from the hardware load balancer 106 to the vNext FE 114. The vNext FE 114 queries the routing information in the vNext hosting database 116 and determines that the site is not valid for vNext. The vNext hosting database 116 returns the routing information of the vCurrent FEs, including vCurrent FE 108, that can handle the request 102C. The vNext FE 114 forwards the request 102C to the vCurrent FE 108 adding an HTTP Header 118 named X-LiveUpgrade with a value of 1. The vCurrent FE 108 queries the routing information in the vCurrent hosting database 110 and determines that the site is not valid. The vCurrent FE 108 forward the request 102C to the vNext FE 114 adding an HTTP Header 122 named X-LiveUpgrade with value 2. The vNext FE 114 detects the loop based on HTTP Header 122 X-LiveUpgrade and returns an HTTP 404 indicating that the site from the request 102C is not valid.

While the above examples illustrate the concepts in conjunction with two different versions of a web based service, it should be appreciated that embodiments may be practiced where more than two versions of a web based service are used. For example, rather than, as illustrated in FIG. 2, simply providing routing information from vNext to vCurrent, additional routing information may be provided to some other version of the web based service if the web site foo.com were not running in vCurrent (whether or not foo.com was valid and running on some other version of the web based service or not). In particular, embodiments could simply add additional routing information for the various versions of the web based service until routing information had been added for each web based service and until an attempt had been made to access foo.com in all of the versions of the web based service without success.

This could be done as illustrated in FIG. 5 where the HTTP Header 122 includes an X-LiveUpgrade value that is updated by incrementing the value until it reaches some value representing the number of versions of the web based service at which point a loop is detected and an HTTP 404 message can be returned indicating that the requested site is not available in the web based service.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
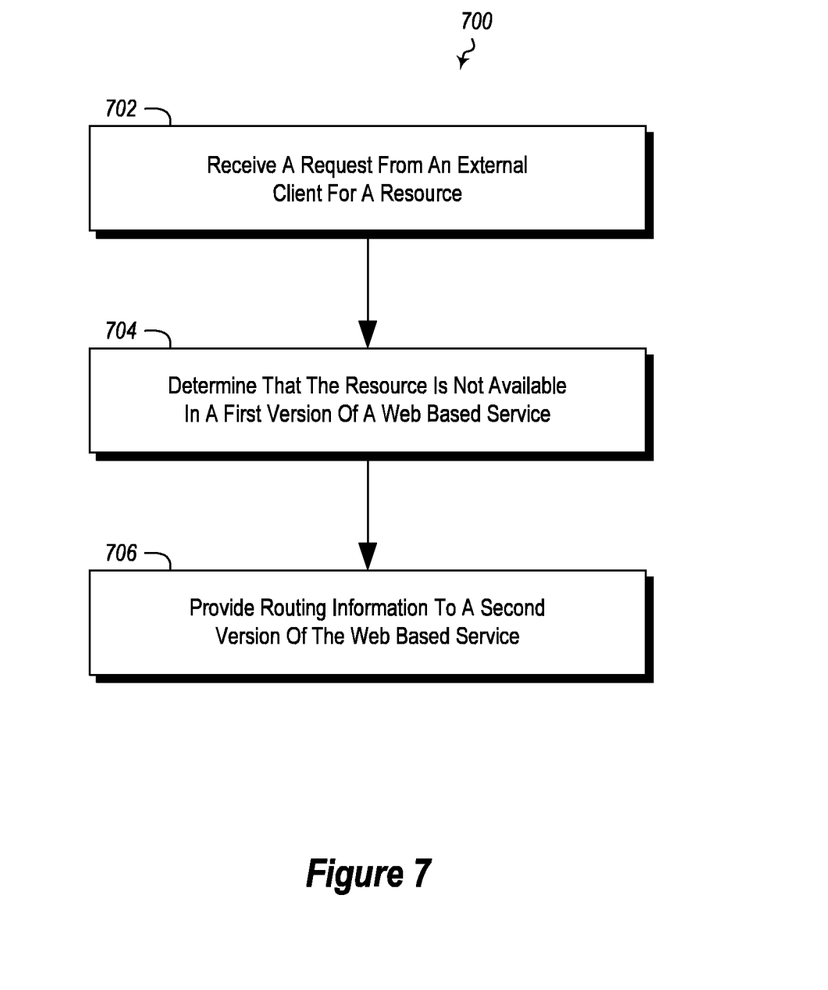
FIG. 7 illustrates a method of servicing requests for resources from a web based service.

Referring now to FIG. 7, a method 700 is illustrated. The method may be practiced in a computing environment. The method 700 includes acts for handling requests for resources of a web based service. The method 700 includes receiving a request from an external client for a resource (act 702). For example, as illustrated in FIG. 2, a request is received for the site foo.com at vNext. Other illustrations of this functionality are shown, as well, in the other examples illustrated in FIGS. 1-6.

The method 700 further includes determining that the resource is not available in a first version of a web based service. For example, as illustrated in FIG. 2, a determination can be made through various querying means that the site foo.com is not available on vNext. FIGS. 3, 5, and 6 illustrate alternate examples of this functionality.

The method 700 further includes providing routing information to a second version of the web based service (act 702). The routing information is readable by the second version of the web based service to allow the second version of the web based service handle the request as a request from the first version and not simply a brand new request from the external client. For example, FIG. 2 illustrates this functionality where the vNext hosting database 116 returns the routing information of the vCurrent FE 108 that can handle the request 102A. The vNext FE 114 forwards the request to the vCurrent FE 108 adding an HTTP Header 118 named X-LiveUpgrade with a value of 1. Other examples of this functionality are illustrated in the examples illustrated in FIGS. 3, 5, and 6.

The method 700 may be practiced where providing routing information comprises adding routing information to the header information of the request. For example, as illustrated in the examples above, routing information may be added to the HTTP header of the request.

The method 700 may further include the second version of the web based service servicing the request when the resource is available at the second version of the web based service. For example, as illustrated in FIG. 2, vCurrent can service the request 102A after receiving it from vNext as the site foo.com is a valid site at vCurrent.

The method 700 may further include at the second version of the web based service, determining that the resource is not available at the second version of the web based service. This version of the method may further include as a result, providing routing information indicating that the resource is not available at the second version of the web based service. This may be used, for example, where the resource is not available at a second version whether there are only two version of the web based service or if there are more than two versions of a web based service being used at the same time. Examples of such functionality are illustrated in FIGS. 5 and 6.

In some examples of these embodiments, the method may be practiced where providing routing information indicating that the resource is not available at the second version of the web based service comprises adding routing information indicating that the resource is not available at the second version of the web based service to the header information of the request. For example, in the example illustrated in FIG. 5, the X-LiveUpgrade value is updated to 2 to indicate that a site is not available at vNext.

Further in some examples of these embodiments, the routing information indicating that the resource is not available at the second version of the web based service is provided in such a fashion that it can be used to prevent looping. The looping would otherwise cause the request to be routed to another version of the web based service that had already indicated that the resource was not available at the another version of the web based service as a result of the second version of the web based service providing routing information indicating that the resource is not available at the second version of the web based service. For example, as illustrated in FIG. 5 incrementing the value of X-LiveUpgrade to a value of 2 indicates to from vNext to vCurrent that the website is not available at vNext. When vCurrent receives the routing information in the HTTP Header 122 with the X-LiveUpgrade value of 2, vCurrent is able to determine that inasmuch as there are two versions of the web based service, the request has been routed to all versions in of the web based version and as such, the resource is not available in any version of the web based service, and an appropriate indication, such as an HTTP 404 message indicating that the website is not available can be made, Thus, the method 700 may be practiced in versions of the method where the routing information indicating that the resource is not available at the second version of the web based service is used to determine that the resource is not available in any version of the web based service.

As noted, embodiments may be implemented where multiple versions of the web based service are operating together, and in some embodiments, the method may 700 may further include sending the routing information from the second version to a third version. If the resource is not available at the third version, additional routing information can be added and forwarded to a fourth version. And so forth until the resource can be found, or it can be determined that the request has been sent to all version of the web based service operating.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in Random-Access Memory (RAM) within a network interface module (e.g., a Network Interface Card "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network Personal Computers (PCs), minicomputers, mainframe computers, mobile telephones, Personal Digital Assistants (PDAs), pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a computing system for handling requests for resources of a web based service, the computing system comprising:
   at least one processor;
   a hardware load balancer, wherein the hardware load balancer is configured to receive a request from an external client for a resource; and
   a first software load balancer and a second software load balancer, wherein the first software load balancer is configured to:
   receive the request from the hardware load balancer;

determine that the resource is not available in a first version of the web based service; and provide routing information to the second software load balancer for a second version of the web based service, wherein the routing information is readable by the second version of the web based service to allow the second version of the web based service to handle the request as a request from the first version of the web based service, and wherein at least one of the first and second software load balancers is configured to update a portion of the routing information to indicate the request was previously made against the first version of the web based service.

2. The computing system of claim 1, wherein the updating the portion of the routing information is performed by adding an indication to the portion of the routing information that the resource is not available at the first version of the web based service.

3. The computing system of claim 2, wherein the indication that the resource is not available is used to prevent looping, which looping would otherwise cause the request to be routed to another version of the web based service that had already indicated that the resource was not available.

4. The computing system of claim 2, further comprising a web worker as part of the second version of the web based service configured to provide the resource when the resource is available.

5. The computing system of claim 2, wherein the hardware load balancer is configured to balance requests for resources between the first software load balancer and the second software load balancer.

6. The computing system of claim 2, wherein the resource is a webpage.

7. The computing system of claim 1, wherein the indication is added to the routing information prior to the routing information being provided to a third version of the web based service.

8. The computing system of claim 1, wherein the source for the resource is a source that previously received the request for the resource or a source that can receive the request for the resource.

9. A method implemented by a computing system in a computing environment, for handling requests for resources of a web based service, the computing system comprising:
at least one processor;
a hardware load balancer, wherein the hardware load balancer is configured to receive a request from an external client for a resource; and
a first software load balancer and a second software load balancer;

the method comprising:
receiving a request from an external client for a resource at the hardware load balancer;
causing the hardware load balancer to provide the request for the resource to the first software load balancer;
causing the first software load balancer to, upon receiving the request from the hardware load balancer:
determine that the resource is not available in a first version of the web based service; and
provide routing information to the second software load balancer for a second version of the web based service, wherein the routing information is readable by the second version of the web based service to allow the second version of the web based service to handle the request as a request from the first version of the web based service; and to cause at least one of the first and second software load balancers to update a portion of the routing information to indicate the request was previously made against the first version of the web based service.

10. The method of claim 9, wherein the portion of the routing information is updated by adding an indication to the portion of the routing information that the resource is not available at the first version of the web based service.

11. The method of claim 10, wherein the indication is used to prevent looping, which looping would otherwise cause the request to be routed to another version of the web based service that had already indicated that the resource was not available.

12. The method of claim 10, wherein the indication is added to the routing information prior to providing the routing information to a third version of the web based service.

13. The method of claim 12, wherein the routing information is further added to with an indication that the resource is not available at a third version of the web based service when it is determined that the resource is not available at the third version of the web service.

14. The method of claim 9, wherein the resource is a webpage.

15. A hardware storage device having stored computer-executable instructions which are executable by one or more processors of a computing system to cause the computing system to implement a method for handling requests for resources of a web based service in a computing environment, the computing system comprising:
the one or more processors;
a hardware load balancer, wherein the hardware load balancer is configured to receive a request from an external client for a resource; and
a first software load balancer and a second software load balancer;

the method comprising:
receiving a request from an external client for a resource at the hardware load balancer;
causing the hardware load balancer to provide the request for the resource to the first software load balancer;
causing the first software load balancer to, upon receiving the request from the hardware load balancer:
determine that the resource is not available in a first version of the web based service; and
provide routing information to the second software load balancer for a second version of the web based service, wherein the routing information is readable by the second version of the web based service to allow the second version of the web based service to handle the request as a request from the first version of the web based service; and to cause at least one of the first and second software load balancers to update a portion of the routing information to indicate the request was previously made against the first version of the web based service.

16. The hardware storage device of claim 15, wherein the portion of the routing information is updated by adding an indication to the portion of the routing information that the resource is not available at the first version of the web based service.

17. The hardware storage device of claim 16, wherein the indication is used to prevent looping, which looping would otherwise cause the request to be routed to another version of the web based service that had already indicated that the resource was not available.

18. The hardware storage device of claim 16, wherein the indication is added to the routing information prior to providing the routing information to a third version of the web based service.

19. The hardware storage device of claim 18, wherein the routing information is further added to with an indication that the resource is not available at the third version of the web based service when it is determined that the resource is not available at the third version of the web service.

20. The hardware storage device of claim 16, wherein the resource is a webpage.

\* \* \* \* \*